J. GALAMB.
TIRE CARRIER.
APPLICATION FILED DEC. 9, 1920.
1,415,870.
Patented May 16, 1922.
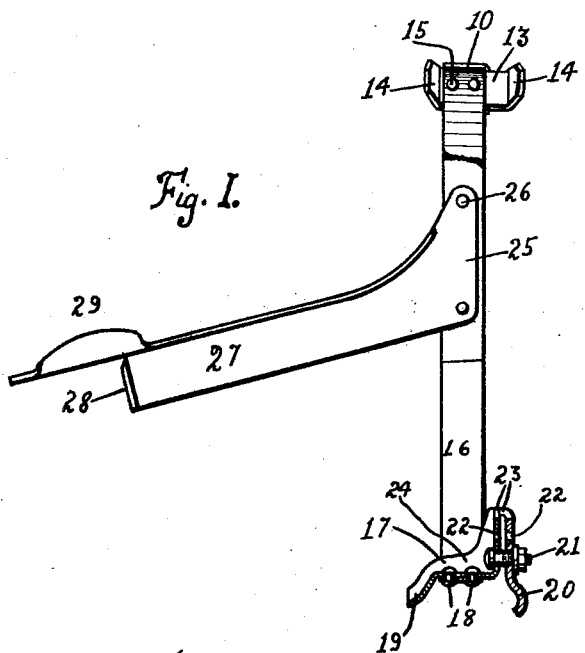
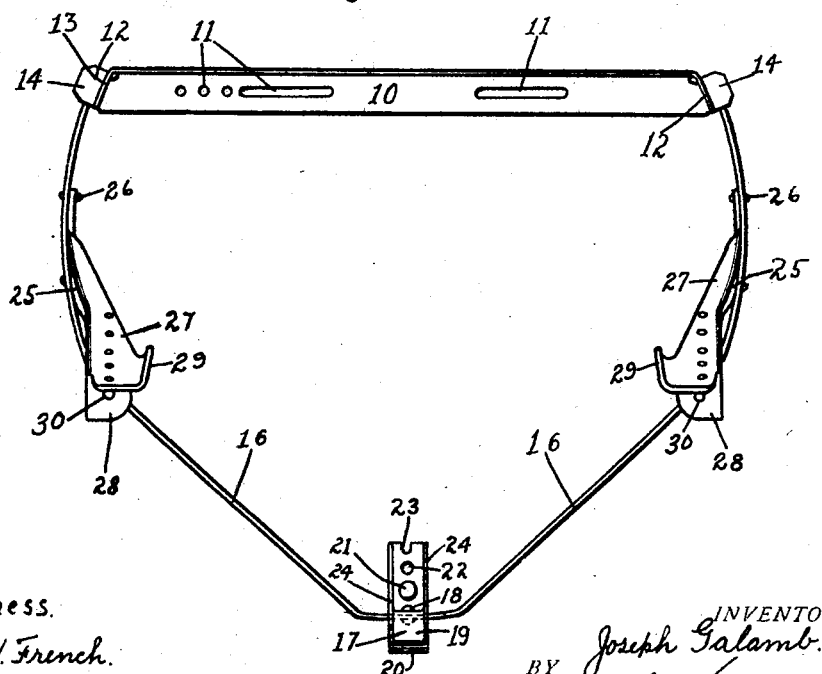
Witness.
C. H. French.
INVENTOR
Joseph Galamb.
BY
J. H. Harness
ATTORNEY

UNITED STATES PATENT OFFICE.

JOSEPH GALAMB, OF DETROIT, MICHIGAN, ASSIGNOR TO FORD MOTOR COMPANY, OF HIGHLAND PARK, MICHIGAN, A CORPORATION OF DELAWARE.

TIRE CARRIER.

1,415,870.  Specification of Letters Patent.  Patented May 16, 1922.

Application filed December 9, 1920. Serial No. 429,448.

*To all whom it may concern:*

Be it known that I, JOSEPH GALAMB, a citizen of the United States, residing at Detroit, in the county of Wayne and State of Michigan, have invented new and useful Improvements in Tire Carriers, of which the following is a specification.

The object of my invention is to provide new and useful improvements in tire carriers of simple, durable and inexpensive construction.

A further object of my invention is to provide a tire carrier adapted to be secured to the rear end of an automobile frame upon which a tire or rim may be readily mounted with a minimum amount of effort and then conveniently locked against removal.

A further object of my invention is to provide a rigid carrier of this description having spaced supporting points for the tire so that these points cannot accidentally be moved relative to each other to thereby loosen the tire, which would be possible if these points were not rigidly supported.
A further object of my invention is to provide a tire carrier having two fixed points of contact with a rim, a manually movable point of contact, and two or more points of contact actuated upon the movement of the manually moved contact.

A further object of my invention is to provide a tire carrier which will combine great strength with a minimum amount of contacting surface relative to the rim mounted thereon.

A further object of my invention is to provide a tire carrier which combines a saving in material with an additional rigidity of the parts.
A further object of my invention is to provide such a tire carrier that may be conveniently manufactured at a minimum cost.

With these and other objects in view, my invention consists in the arrangement, combination, and construction of the various parts of my improved device, as described in the specification, claimed in my claims, and shown in the accompanying drawings, in which:
Figure 1 is a side elevation of a tire carrier constructed according to my invention and Figure 2 shows a front elevation of the carrier illustrated in Figure 1.
Referring to the accompanying drawings, I have used the reference numeral 10 to indicate generally a cross bar member for my carrier which is formed from a piece of angle iron, disposed in substantially a horizontal position and provided with slots and openings 11 for the purpose of supporting a lamp and a license plate. Adjacent to either end of the cross bar 10 the vertical web thereof is cut away so that the upper web may be bent down at 12 to form an attaching means for the remaining portion of the tire carrier. Fixed to these bent over portions 12 are tire or rim supporting clips 13 having their end ears 14 adapted to extend upwardly along, and to engage the sides of a tire or rim. A strip of material of comparatively great rigidity forms the body portion of my improved carrier and has its ends fastened to the clips 13 and the bent over portions 12 by pairs of rivets 15. This body portion is curved adjacent to its ends and the clips 13 for a distance to conform generally to the outline of the tire which is to be supported by the carrier. The member is then inclined downwardly and inwardly at 16 to position below the central portion of the cross bar 10. At this point a rim or tire engaging clip 17 is secured to the body member by the rivets 18. The clip 17 has a single ear 19 at its forward edge designed to form a stop for the rim or tire when the latter is placed upon the carrier.

In the installation of a tire or rim upon this carrier the inner surface of the tire rim is hooked over the two spaced clips 13 between the respective pairs of ears 14, and then the lower central portion of the tire rim is pushed in over the clip 17 to position where its forward inner edge contacts with the stop 19. The stop 19 is inclined at the place where it contacts with a rim downwardly and forwardly, as will be seen by referring to the accompanying drawings.

A movable stop 20 is pivotally secured to the clip 17 by a bolt 21. The movable stop 20 and an upward projection at the rear edge of the clip 17 have aligned openings 22 therein, and above these aligned openings are aligned notches 23. The upper edge or end of the movable clip 20 is turned over forwardly and engages the upper edge of the upward extension on the clip 17. The upward extension of the clip 17 has forwardly extending vertical flanges 24 which serve to reinforce the clip and extension.

When a tire or rim has been installed upon the carrier, as described, and its forward inner edge pushed against the stop 19, then the stop 20 may be slid onto the bolt 21 and the latter tightened to draw the lower part of the stop 20 against the rear inner edge of the tire or rim. As the upper end of the stop 20 is turned in against the upward extension on the clip 17, it will be seen that tightening of the bolt 21 will draw the lower end of the stop 20 against said tire or rim, and the natural resiliency of the stop 20 will cause it to engage the tire or rim with a slightly yielding force which will prevent the latter from rattling. The forward pressure of the stop 20 against the rim will cause the latter to climb the inclined surface of the stop 19, thereby drawing the rim down against the clips 13. Continuing the pressure on the stop 20 will then press the lower central portion of the body member upwardly, thereby through the converging straight portion 16, tending to force curved portions of the body member outwardly against the inner surface of the rim. These straight portions reinforce the carrier on the same principle that diagonal braces are used in reinforcing other structures. In order to prevent theft of the tire or rim and accidental misplacement of the stop 20, a shackle of a padlock may be inserted through the aligned openings 22 and provided with a shackle which will enter the notches 23 which will then prevent the unauthorized or accidental removal or turning of the stop 20.

For supporting the tire carrier on the frame of an automobile I provide the brackets illustrated in the drawings. These brackets have comparatively wide portions 25 at their rear ends, which are fastened to the round portions of the body member of the carrier by the rivets 26. These comparatively wide portions 25 are formed by flattening out the end of an angle iron 27. The opposite end of these angle irons 27 have their vertical webs cut away for a distance and the end portion of the remaining part of the vertical web folded in at 28 to brace the horizontal portion of the bracket. The horizontal portion of the angle iron extends beyond this turned in portion 28 and is provided with a turned up ear 29. This extending horizontal portion is designed to be secured to the top rear end of a frame member of an automobile, while the turned in portion 28 rests against the rear end of the frame, where it may be secured by a rivet or bolt passed through the hole 30. Bolts or rivets may be used for securing the horizontal extended portion to the frame. The turned up ear 29 fits over the curved up cross member at the back of the automobile frame. In connection with the supporting brackets it will be noted that the rear ends thereof forming the ears 25 are curved to conform to the curved portions of the body member of the carrier so that when the rivets 26 are used for securing the ears 25 to the body member, then it will be very difficult for anyone to attempt to detach the body member from the brackets due to the close fit between them and the fact that a rim will overhang the connecting portions somewhat.

The practical operation of my device has been brought out in the course of this specification, but it may be added that this device is designed to be either attached to a used automobile as an accessory or to a new car as part of its factory equipment. Moreover the construction of the supporting brackets is such that they form a rigid connection with the frame of an automobile which strengthens rather than weakens the frame itself. The arrangement and connection of these brackets is such that they form a very strong support for the tire carrying means so that it may receive a heavy blow without being materially injured. This strong construction also makes it necessary for any unauthorized person who attempts to tamper with the tire or rim carried by the carrier to use very heavy tools and considerable time before he can damage the carrier sufficiently to remove the tire or rim. It may also be mentioned that the ears 14 and the stops 19 and 20 are each slid away from their co-acting members so that when a rim or tire is placed in the carrier then that tightening the stop 20 will draw the tire or rim down between the co-acting sliding surfaces thereby gripping it rigidly and holding it against vibration or rattling. A slight inherent resiliency in the stop 20 further prevents rattling of the tire or rim. The construction of the parts is such, too, that a rim mounted on the carrier engages only the clips 13 and 17, as distinguished from engaging the entire ring or rim, so that a tire is much more easily secured in the carrier than is the case where such tire or rim must be closely fitted to the support.

The inclined portions 16 of the body member form a substantial brace to prevent raising the clip 17 up toward the clips 13 and prevent one of the clips 13 from being sprung toward the opposite clip 13 and clip 17 so that the support could be collapsed sufficiently to permit unauthorized removal of the tire thereon. A further advantage arises from the use of the inclined portion 16 in that it saves a considerable amount of material over a carrier which uses a round body member.

In the foregoing I have described this carrier as being used for either a tire or rim, and it will be understood that it is adapted to hold any substantially rigid round article with an open center from accidental or unauthorized removal.

Some changes may be made in the arrangement and construction of the various parts of my improved device without departing from the spirit of the invention therein and it is my intention to cover by my claims such changes as may be reasonably included within the scope thereof.

I claim as my invention:

1. In a tire carrier a cross bar, rim engaging means at either end thereof, a body member having curved end portions, the ends of which are disposed adjacent to the ends of said bar, means for securing said rim engaging means, the ends of the body member, and the ends of the bar together, a rim engaging device disposed intermediate of the ends of the body member, the latter being formed with straight portions between said last described rim engaging device and the curved portions, and a co-acting movable member disposed adjacent to the last described rim engaging device.

2. In a device of the class described, a body member of slightly resilient material having curved end portions and converging straight intermediate portions, a cross member of rigid material, supporting brackets having wide ears at one end curved to fit the curved portions of the body and angular intermediate portions, and a rim engaging clip at the central portion of the body member adapted when actuated to force the adjacent portion of a rim away from the body member, whereby the rim may be brought into contact with the rigid portions at the ends of the body member, and whereby the latter may be slightly bent to force additional portions of the curved parts of the body outwardly toward the rim.

3. In a tire carrier, a body member having curved end portions adapted to conform to the curvature of a tire or rim, relatively straight intermediate portions, and a relatively sharp bend between the straight portions, adjustable rim-engaging devices disposed on said body member adjacent to the sharp bend above described, a rigid transverse bar extended between the ends of said body member, and rim engaging members disposed adjacent to the ends of the bar and body member, and brackets for supporting said structures secured to the body member at said curved portions whereby movement of the adjustable locking devices into contact with a rim may force the curved portions of the body member into engagement with other portions of the rim thereby insuring a tight frictional contact between the body member and a rim mounted thereon at the place where the body member is supported.

JOSEPH GALAMB.

Witness:
RICHARD J. CORNELL, Jr.